US009712761B2

(12) United States Patent
Vartanian

(10) Patent No.: US 9,712,761 B2
(45) Date of Patent: Jul. 18, 2017

(54) METHOD FOR EMBEDDING PRODUCT INFORMATION IN VIDEO USING RADIO FREQUENCEY INFORMATION

(71) Applicant: QUALCOMM TECHNOLOGIES INTERNATIONAL, LTD., Cowley Road (GB)

(72) Inventor: Michael Christopher Vartanian, Commerce Township, MI (US)

(73) Assignee: QUALCOMM Incorporated, San Diego, CA (US)

(*) Notice: Subject to any disclaimer, the term of this patent is extended or adjusted under 35 U.S.C. 154(b) by 58 days.

(21) Appl. No.: 14/289,307

(22) Filed: May 28, 2014

(65) Prior Publication Data
US 2015/0350561 A1 Dec. 3, 2015

(51) Int. Cl.
H04N 5/265 (2006.01)
G06K 9/52 (2006.01)
H04N 5/04 (2006.01)
G06F 17/30 (2006.01)
G06K 9/00 (2006.01)
G11B 27/02 (2006.01)
G06K 9/46 (2006.01)

(52) U.S. Cl.
CPC ....... H04N 5/265 (2013.01); G06F 17/30247 (2013.01); G06K 9/00711 (2013.01); G06K 9/46 (2013.01); G06K 9/52 (2013.01); G11B 27/02 (2013.01); H04N 5/04 (2013.01); G06K 2009/4666 (2013.01); G06K 2209/27 (2013.01)

(58) Field of Classification Search
CPC ...... H04N 5/04; H04N 5/265; G06K 9/00711; G06K 9/46; G06K 9/52; G06K 2009/4666
See application file for complete search history.

(56) References Cited

U.S. PATENT DOCUMENTS

| 6,084,591 | A  | * | 7/2000  | Aleksic ............... | G06T 15/405 345/422 |
| 7,933,809 | B2 | * | 4/2011  | Abraham ............... | G06Q 30/02 705/26.1 |
| 8,339,458 | B2 | * | 12/2012 | Abraham ............. | G10H 1/0008 348/164 |
| 8,668,136 | B2 | * | 3/2014  | Ahern ................. | G01C 15/002 235/375 |

(Continued)

FOREIGN PATENT DOCUMENTS

WO 2014026065 A1 2/2014

Primary Examiner — Brian Yenke
(74) Attorney, Agent, or Firm — The Marbury Law Group

(57) ABSTRACT

Embodiments are directed towards tracking physical objects' pixel locations in a stream of video frames. Radio frequency (RF) readers may be positioned relative to a scene. RF tags may be positioned in the scene at known pixel locations within the field of view of a video recording device. The RF tags may be enabled to generate RF signals to the RF readers. The RF readers may generate RF values based on the RF signals, which may be employed to determine a function to translate the RF values into known pixel locations within a video frame. An RF tag may be disposed at a physical location of at least one object within the scene. A stream of video frames and RF values may be recorded over time. The function may be employed to translate the recorded RF values into pixel locations for the least one object each recorded video frame.

15 Claims, 9 Drawing Sheets

(56) References Cited

U.S. PATENT DOCUMENTS

| | | | |
|---|---|---|---|
| 8,810,401 B2* | 8/2014 | Karttaavi | G01S 13/74 235/375 |
| 8,917,972 B2* | 12/2014 | Abraham | G10H 1/0008 348/169 |
| 9,068,836 B2* | 6/2015 | Arteaga | G01C 21/00 |
| 2004/0164858 A1* | 8/2004 | Lin | G08B 13/19608 340/522 |
| 2005/0078853 A1* | 4/2005 | Buehler | G06T 7/2053 382/103 |
| 2006/0028552 A1* | 2/2006 | Aggarwal | G01S 3/7864 348/169 |
| 2006/0204045 A1* | 9/2006 | Antonucci | G06K 9/00342 382/107 |
| 2008/0169929 A1* | 7/2008 | Albertson | G08B 13/19613 340/573.1 |
| 2008/0172261 A1* | 7/2008 | Albertson | G06K 9/00335 382/103 |
| 2009/0195360 A1 | 8/2009 | Jeon et al. | |
| 2010/0030350 A1* | 2/2010 | House | A63B 24/0021 700/91 |
| 2010/0097221 A1 | 4/2010 | Kreiner et al. | |
| 2010/0103173 A1* | 4/2010 | Lee | G01S 3/7864 345/427 |
| 2011/0153362 A1* | 6/2011 | Valin | G06Q 20/105 705/3 |
| 2012/0068813 A1* | 3/2012 | Karttaavi | G01S 13/74 340/5.2 |
| 2012/0195574 A1* | 8/2012 | Wallace | H04N 5/772 386/278 |
| 2012/0233105 A1* | 9/2012 | Cavallaro | G01S 5/16 706/46 |
| 2012/0271440 A1* | 10/2012 | Lunner | A63B 71/0622 700/91 |
| 2013/0080916 A1* | 3/2013 | Lopez et al. | 715/753 |
| 2014/0140575 A1* | 5/2014 | Wolf | G06K 9/3233 382/103 |
| 2014/0154452 A1* | 6/2014 | Kim | A43B 13/187 428/54 |
| 2014/0167958 A1* | 6/2014 | Kimchi | A01K 1/031 340/539.13 |
| 2014/0178953 A1* | 6/2014 | Koch | C12Y 208/0300 435/147 |
| 2015/0055822 A1* | 2/2015 | Zhou | G06F 3/017 382/103 |
| 2015/0104956 A1* | 4/2015 | Pullens | B23K 26/367 438/795 |
| 2015/0206012 A1* | 7/2015 | Stout | G06K 9/00711 382/103 |
| 2015/0235076 A1* | 8/2015 | Aimonen | G06K 9/00342 348/157 |
| 2015/0302027 A1* | 10/2015 | Wnuk | G06K 9/00744 382/305 |
| 2016/0086635 A1* | 3/2016 | Kreiner | G01S 13/82 340/572.1 |
| 2016/0293217 A1* | 10/2016 | Hanis | G06K 7/10297 |

* cited by examiner

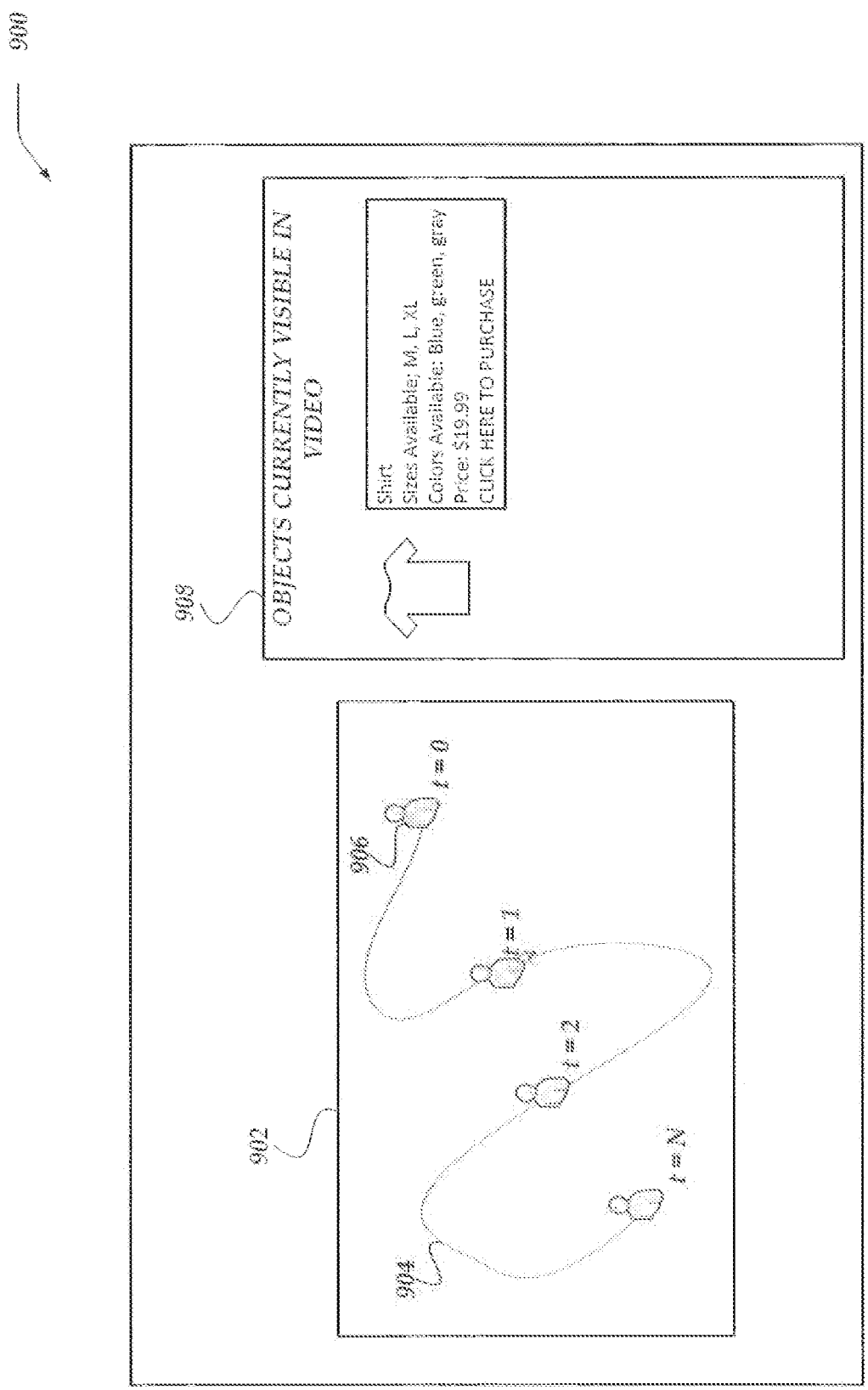

METHOD FOR EMBEDDING PRODUCT INFORMATION IN VIDEO USING RADIO FREQUENCEY INFORMATION

TECHNICAL FIELD

The present invention relates generally to tracking objects in a video frame, and more particularly, but not exclusively, to translating radio frequency (RF) streams from an RF tag that is associated with an object in a 3-D space to be a location of the object on a 2-D video screen.

BACKGROUND

As technology has progressed over the last decade, more and more content is being made available to users online, including audio clips, images, and videos. Hundreds of millions of people view billions of videos online every year. Often these online videos are advertisements for various goods and/or services. If a user watches an advertisement and sees something that they would like to purchase, or gather more information about, the user typically has to visit the seller's website, or another website, to purchase or get additional information. For example, if a user sees a video advertisement for a pair of shoes from Company A, the user may have to leave the current webpage (e.g., the webpage with the video advertisement) and visit Company A's website. However, sometimes the user may not have Company A's web address and may resort to a search engine or other means to find a retailer that sells the shoes. As a result, sales may be diverted away from Company A, even though their advertisement drove the user to purchase the shoes.

In other instances, some video advertisements show many different goods and/or services. For example, an advertisement for a clothing company may include shoes, shirts, pants, and a variety of other goods/services that, they offer. Similar to before, the user may have to resort to search engines or other methods to locate a particular product that they saw in the video advertisement, which again may divert sales away from the clothing company. Currently, some solutions have a user manually adding metadata to a video after the video is recorded. Unfortunately, this solution is rather labor intensive and time consuming. Also, object recognition is often inaccurate and unreliable to track objects within an image. Thus, it is with respect to these considerations and others that the invention has been made.

BRIEF DESCRIPTION Of THE DRAWINGS

Non-limiting and non-exhaustive embodiments of the present invention are described with reference to the following drawings. In the drawings like reference numerals refer to like parts throughout the various figures unless otherwise specified.

For a better understanding of the present invention, reference will be made to the following Detailed Description, which is to be read in association with the accompanying drawings, wherein:

FIGS. 8-9 show use-case examples of embodiments of a video with a tracked object.

DETAILED DESCRIPTION

Figure 1:
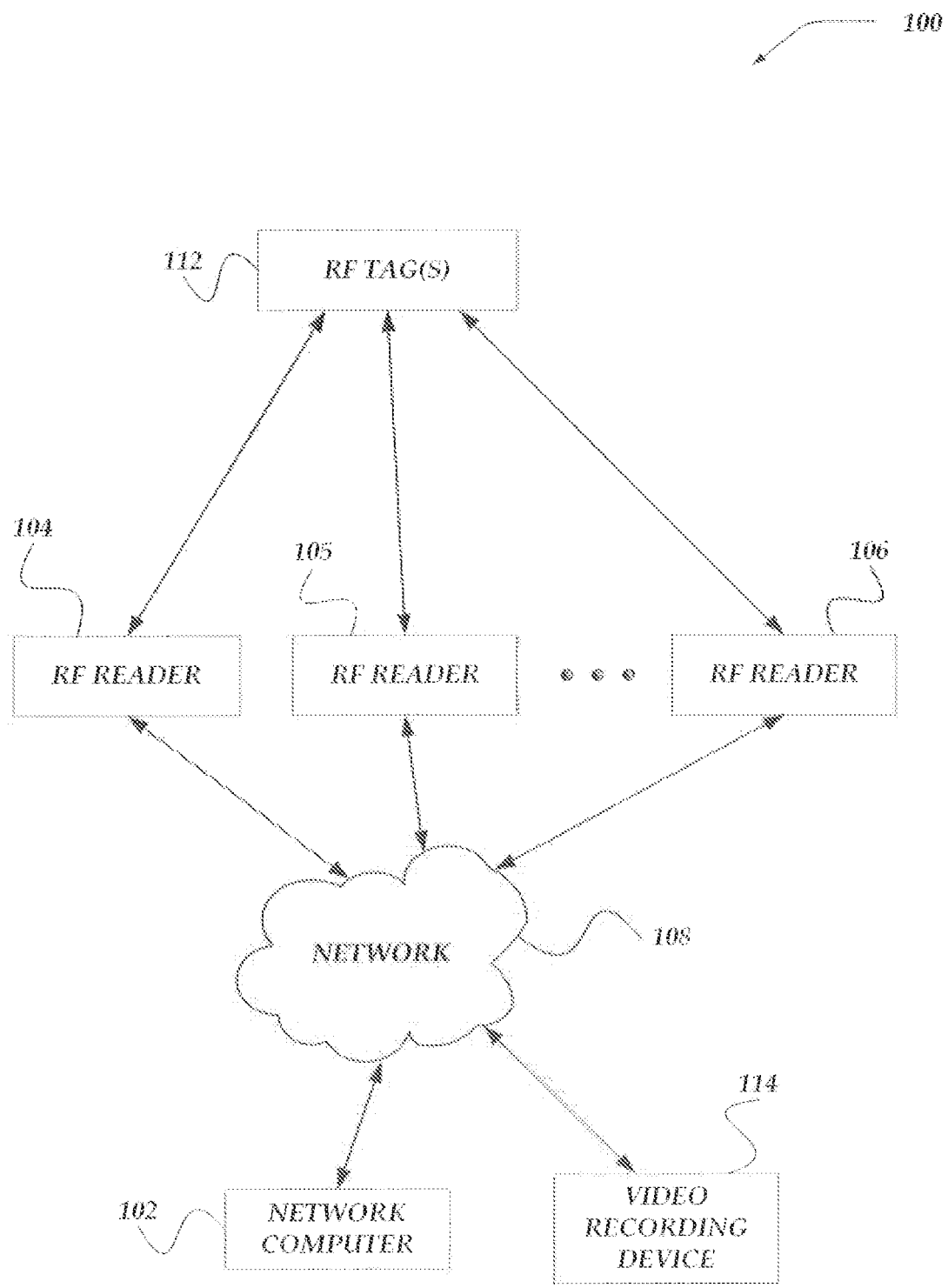
FIG. 1 is a system diagram of an environment in which embodiments of the invention may be implemented.

Various embodiments are described more fully hereinafter with reference to the accompanying drawings, which form a part hereof and which show, by way of illustration, specific embodiments by which the invention may be practiced. The embodiments may, however, be embodied in many different forms and should not be construed as limited so the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, canons embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "object" may refer to a physical item positioned within a scene that may be in the field of view of a video recording device. Since an object may move or change position within the scene during a video recording (by the video recording device), the object may be at least partially visible within the field of view for at least a portion of the video. So, when the video is played back to a user on a video screen, the object may be at least partially visible within one or more video frames (i.e., visible to the riser on the video screen) of the video.

In various embodiments, each object in a recorded scene may be associated with a separate RF tag. As described herein, information from the RF tag can be utilized to track a location of the object within one or more video frames (i.e., within the playback video screen). An RF tag may be disposed at a physical, location of an object for tracking. In some embodiments, an RF tag may be attached and/or otherwise affixed to an object. Attaching an RF tag to an object may include a permanent or temporary mechanism, such as, for example, clasp, pin, adhesive (similar to a sticker), or the like. In other embodiment the RF tag may not be attached to the object, but may be embedded or included therein, such as, for example, embedded in the object (e.g., sewn into a garment), placed into a carrying device attached to the object (e.g., in a pocket of a garment), or the like. In some embodiments, an object with an attached RF tag may be referred to as a "tracked objects."

As used herein, the term "RF tag" may refer to a circuit, chip, module, or other device that can use radio frequencies to transfer information and/or data to another device, referred to herein as an RF reader. In various embodiments, an RF tag may also be referred to an RFID tag or, more generally, as an RF transmitter or RF emitter. Although described as an RFID tag, embodiments are not limited to only RFID transmissions, but rather, to all types of radio frequency transmissions such as Bluetooth, Bluetooth SMART, WiFi (802.11x), Zigbee, 802.15.4, proprietary, or the like.

RF tags may be passive, active, battery-assisted passive (e.g., is activated with in the presence of an RF reader), or the like. In some embodiments, an RF rag may periodically send out an RF signal, such as a beacon. In other embodiments, an RF tag may initiate communication with an RF reader, such that both devices communicate information back and forth. In yet other embodiments, the RF reader may initiate communication with an RF tag, such that the RF reader prompts the RF tag to respond.

In some embodiments, an RF tag may transmit an RF signal that includes an identifier of the tag, and thus identify the object that the RF lag is attached to. The RF tag identifier can be used to look up (e.g., in a database) additional information about the object. In other embodiments, the RF tag may transmit an RF signal that includes both its identifier and the additional information (e.g., other object information) to the RF reader. For example, if the RF tag communicates with the RF reader via Bluetooth or Wifi, the RF tag may provide the additional information in a packet to the RF reader upon initiating communication with the RF reader. In at least one such embodiment, this type of RF tag may be a "smart RF tag."

As used herein, the term "RF reader" may refer to a device that can communicate with an RF tag to obtain information from the RF tag (e.g., an RF tag identifier). In various embodiments the RF reader can transmit a communication to tags within its communication range (which may depend on the type and/or capabilities of the RF reader and/or RF tag). Each tag can individually respond with its own identifier and/or other information (e.g., object information). In some embodiments. RF readers may be embedded and/or including in network computers, such as smart phones or other client computers. In other embodiments, RF readers may be stand-alone devices. In various embodiments, each RF reader may record, store, and/or communicate received RF signals, RF values, and/or tag information to other RF readers or network computers (e.g., network computer 102 of FIG. 1). Although described as an RFID reader, embodiments are not limited to only RFID transmissions, but rather, to all types of radio frequency transmissions such as Bluetooth, Bluetooth SMART, WiFi (802.11a), Zigbee, 802.15.4, proprietary, or the like.

As used herein, the term "RF signal" may refer to the signal transmitted from the RF tag to an RF reader. As described herein, the RF signal may include and/or have embedded RF tag information (e.g., identifier and/or additional object information). In some embodiments, the RF signal may be Bluetooth™, Bluetooth SMART, WiFi (802.11x), Zigbee, proprietary, other radio frequency transmission technologies, or the like. The range of an RF signal may vary depending on the RF tag and/or RF reader employed, as well as the transmit power of the transmitter (RF tag) and receive sensitivity of the receiver (RF reader).

As described herein, various characteristics of an RF signal and/or the communication between the RF reader and RF tag may be employed to track an RF tag—and its corresponding object. These characteristics may include a transmit/broadcast power/strength and a received signal strength from the RF tag (e.g., received signal strength indicator (RSSI), direction of arrival (DOA), return trip tune (RTT), or the like. In various embodiments, these characteristics may be in the form of a value, which may be referred to as an "RF value" or "RF signal value." For example, in some embodiments, the RF value may be based on the RSSI and transmit power of an RF signal received by an RF reader from an RF tag. In other embodiments, the RF value may include a plurality of angles indicating a direction of arrival of the RF signal at an RF reader. In yet other embodiments, the RF value may correspond to the time it takes for a message to be sent from an RF reader to an RF tag and for the RF reader to receive a response from the RF tag. However, embodiments are not so limited and other characteristics of the RF signal and/or communication between the RF reader and the RF tag may be employed As used herein, the term "series of RF values" or "RF value series" may refer to a plurality of RF values received by an RP reader from an RF tag over time. As described herein, an RF reader may begin recording a series of RF values in parallel with a video recording device that is recording a video stream of a scene. Accordingly, the series of RF values may be synchronized with the video stream. Additionally, each separate RF reader may record a series of RF values from each separate RF tag included in the scene. So, a series of RF values may be a plurality of RF values obtained by a given RF reader from a given RF tag. In some embodiments, a set of RF values may refer to a plurality of RF values, where each value is obtained by a given RF reader from a given RF tag for a given video frame. In various embodiments, a plurality of series of RF values may comprise a plurality of sets of RF values, where each set is associated with a different video frame. As indicated above, wireless technologies other than radio frequency transmissions may also be employed.

As used herein, the term "function" or "translation, function" may refer to an algorithm, process, or function for converting, normalizing, or otherwise translating a plurality of RF values into a two-dimensional pixel location within a video frame. As used herein, "pixel location" may refer to a single pixel or a group-region of pixels that represent the location of the object in the video frame, which may be relative to the disposition of the tag on the object. So in some embodiments, the pixel location may be a plurality of pixels.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to tracking physical objects' pixel locations in a stream of video frames. In various embodiments, at least one RF lag may be disposed at a physical location of at least one object within a scene, information regarding the at least one object may be associated with at least one radio frequency (RF) tag. The RF tags may be enabled to generate/provide at least one RF signal to a plurality of RF readers. Each RF reader may generate a plurality of RF values (e.g., a series of RF values) based on the at least one RF signal.

In various embodiments, a function to translate the plurality of RF values (e.g., three or more RF values from three or more RF readers) into at least one initial pixel location within a video frame of a scene that includes the physical location of the at least one object may be determined. The at least one initial pixel location may enable a field of view to be identified for the scene in the video frame. In various embodiments, each RF value may include a received signal strength indicator of the at least one RF signal. In some embodiments, each of the plurality of RF readers may be employed to determine a configuration RF value for at least one configuration RF tag that is positioned within the field of view of the scene relative to the at least one initial pixel location within the video frame. The configuration RF values may be normalized for each of the at least one configuration RF tag to be a pixel location representative of the at least one initial pixel location.

A stream of video frames for the scene that includes the at least one object may be recorded over time. As the video frames are recording, each of the plurality of RF readers may be enabled to record RF values over time for the at least one RF tag, such that the recorded RF values are synchronized over time with the recorded stream of video frames. The determined function may be employed to translate the recorded RF values into at least one pixel location for the least one object positioned in the field of view of the scene for each recorded video frame. In some embodiments, the at least one pixel location of the at least one object may be embedded in each recorded video frame. In other embodiments, embedding information regarding the at least one object in each recorded video frame.

In various embodiments, the recorded stream of video frames may be provided to at least one user. Information that corresponds to the at least one object may be provided to the user based on a mouse click or mouse over of the at least one pixel location of the at least one object positioned in the field of view of the scene in the recorded stream of video frames. In some embodiments, a region may be overlaid over the at least one object in the field of view of the scene based on the at least one pixel location in the recorded video frames. This region may enable at least one action associated with the at least one object based on an interaction by a user.

In various embodiments, a side screen, side panel, window, or the like may be employed to display the objects that are visible within the video (i.e., within the field of view of the scene. This side screen may be positioned so as to not overlap or obscure the video. In various embodiments, an object may be visible within the video (and added to the side screen) based on the determined pixel location, such as if a pixel location is within the perimeter of the video frame. In at least one embodiment, the object may be removed from, the side screen if the object exits the video frame (as determined by the pixel location). In some embodiments, if a user interacts (e.g., mouse click) with the region associated with an object, then the object in the side screen may be highlighted, shown additional object information, or the like.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include network computer 102, video recording device 114, network 108. RF readers 104-106, and one or more RF tags 112.

In various embodiments, each of RF tag(s) 112 may be attached to a separate physical object that may be at least partially visible in at least one video frame of a video (e.g., a video recorded by video recording device 114). RF tag(s) 112 may send out RF signals to communicate information with RF readers 104-106 via various different communication technologies, including but not limited to, Bluetooth™, Zigbee, Wi-Fi, or the like. This communicated information may include an identifier of the corresponding RF tag and/or information regarding the object that the corresponding RF tag is associated with (i.e., attached to).

In some embodiments, each of RF readers 104-106 may receive RF signals from each of RF tag(s) 132. In some embodiments, three RF readers may be employed, and in other embodiment, four or more RF readers may be employed. In some embodiments, more RF leaders may be employed, to increase the accuracy of a location of a tracked object in a video frame. However, the additional RF signals from the additional RF readers may increase computation complexity and/or processing resources, power, and/or time. In some embodiments, an RF reader may be embedded or associated with a network computer, such as network computer 200 of FIG. 2 (e.g., a smart phone).

In various embodiments, each RF reader may record and/or store information associated with each RF signal received from each RF tag. As indicated herein, the RF signal may include or have a RF tag identifier embedded in the RF signal, which may be stored, by the RF reader that receives the RF signal. In some embodiments, the RF signal may also include additional information, such as object information, which may also be recorded and stored by the RF reader. In at least one of various embodiments, the RF reader may record and/or store an RF value (e.g., RSSI in combination with transmission power of the RF signal from the RF tag) that corresponds to the received RF signal.

In some embodiments, the RF value may be based on a distance determined as a function of transmit power and RSSI. For example, if the transmit power is known at the source and know that power decays at approximately $1/r^2$, using the measured, power at the receiver (RSSI), the distance (r) may be determined (noting that other power decay functions may be employed).

In various embodiments, the RF reader may record the RF values over time to create a series of RF values. In at least one of various embodiments, each of RF readers 104-106 may record a series of RF values from each separate RF tag 112 in parallel (or synchronously) with video recording device 114 recording a video. In various embodiments, each of RF readers 104-106 may provide and/or otherwise transmit the recorded series of RF values and associated RF tag information (e.g., RF tag identifier and/or other object information) for each of RF tag(s) 112 to network computer 102.

At least one embodiment of network computer 102 is described in more detail below in conjunction with network computer 200 of FIG. 2. Briefly, in various embodiments, network computer 102 may communicate with RF readers 104-106 and/or video recording device 114 via network 108. Although illustrated as a single device, network computer 102 may include a plurality of separate network computers. In some embodiments, network computer 102 and video recording device 114 may be separate devices (as illustrated). In other embodiments, a single device may be operative to provide the functionality of both network computer 102 and video recording device 114. Similarly, in some embodiments, a single device may be operative to provide the functionality of both network computer 102 and an RF reader.

In some embodiments, network computer 102 may operate over a wired and/or wireless network to communicate with RF readers 104-106, video recording device 114, or other computer devices. Generally, network computer 102 may include computing devices capable of communicating over a network to send and/or receive information, perform various online and/or offline activities, or the like. It should be recognized that embodiments described herein cue not constrained by the number or type of network computers employed, and more network computers—and/or types of network computers—than what is illustrated in FIG. 1 may be employed.

Devices that may operate as network computer 102 may include various computing devices that typically connect to a network or other computing device using a wired and/or wireless communications medium. Network computers may include portable and/or non-portable computers. In some embodiments, network computers may include client computers, server computers, or the like. Examples of network computer 102 may include, but are not limited to, desktop computers, personal computers, multiprocessor systems, microprocessor-based or programmable electronic devices, network PCs, laptop computers, smart phones, tablet computers, cellular telephones, handheld computers, integrated devices combining functionality of one or more of the preceding devices, or the like. As such, network computer 102 may include computers with a wide range of capabilities and features.

Network computer 102 may access and/or employ various computing applications to enable users of the network computer to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computer 102 may be enabled to connect to a network through a browser, or other web-based application.

Network computes 102 may further be configured to provide information that identifies the network computer. Such identifying information may include, but is not limited to, a type, capability, configuration, name, or the like, of the network computer. In at least one embodiment, a network computer may uniquely identify itself through any of a variety of mechanisms, such as an Internet Protocol (IP) address, phone number. Mobile Identification Number (MIN), media access control (MAC) address, electronic serial number (ESN), Bluetooth Address, universally unique identifier (UUID), or other device identifier.

Network computer 102 may communicate with RF readers 104-106 and/or video recording device 114 via network 108, which may be wired and/or wireless communication technology. Such wireless communication technology may include virtually any wireless technology for communicating with a remote device, such as, but not limited to Bluetooth™, Wi-Fi, or the like.

Network 108 may be configured to couple network computers with other computing devices, including network computer 102, RF readers 104-106, video recording device 114, other computer devices, other networks, or the like. In various embodiments, information communicated between devices may include, but not limited to, processor-readable instructions, client requests, server responses, program modules, applications, raw data, control data, video data, voice data. Image data, text data, or the like. For example, in some embodiments, each of RF readers 104-106 may communicate a series of RF values—generated from RF tag(s) 112—to network computer 102. In other embodiments, video recording device 114 may communicate a video stream to network computer 102. In at least one of various embodiments, the communicated video stream may represent a recorded video of at least one object that has RF tag(s) 112 attached thereto. In various embodiments, this information may be communicated between devices using one or more technologies and/or network protocols. In some embodiments, an RF reader can transmit the data to the video recording device directly via some protocol, such as universal asynchronous receiver/transmitter (UART). In other embodiments, the network computer may be in front of the video recording device in order to perform signal processing prior to recording the RF information.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another, for example, network 108 can include—in addition to the Internet—LANs, WANs, Personal Area Networks (PANs), Campus Area Networks (CANs), Metropolitan Area Networks (MANs), direct communication connections (such as through a USB port, UART, SPI, etc.), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may farther overlay stand-alone ad-hoc networks, or the like, to provide an infrastructure-oriented connection for at least network computer 102. Such sub-networks may include mesh networks, Personal Area Networks (PAN). Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or filth (5G) of communication protocols and/or technologies that may be employed by the network may include, but are not limited to, Global System for Mobile communication (GSM). General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computer 102 and other computing devices, other networks, or the like.

In various embodiments, at least a portion of the network may be operative as an autonomous system of nodes, links, paths, terminals, gateways, routers, switches, firewalls, load balancers, forwarders, repeaters, optical-electrical converters, or the like, which may be connected by various communication links. These autonomous systems may be configured to sell-organize based on current operating conditions and/or rule-based policies, such that the network topology of the network may be modified.

Illustrative Network Computer

Figure 2:
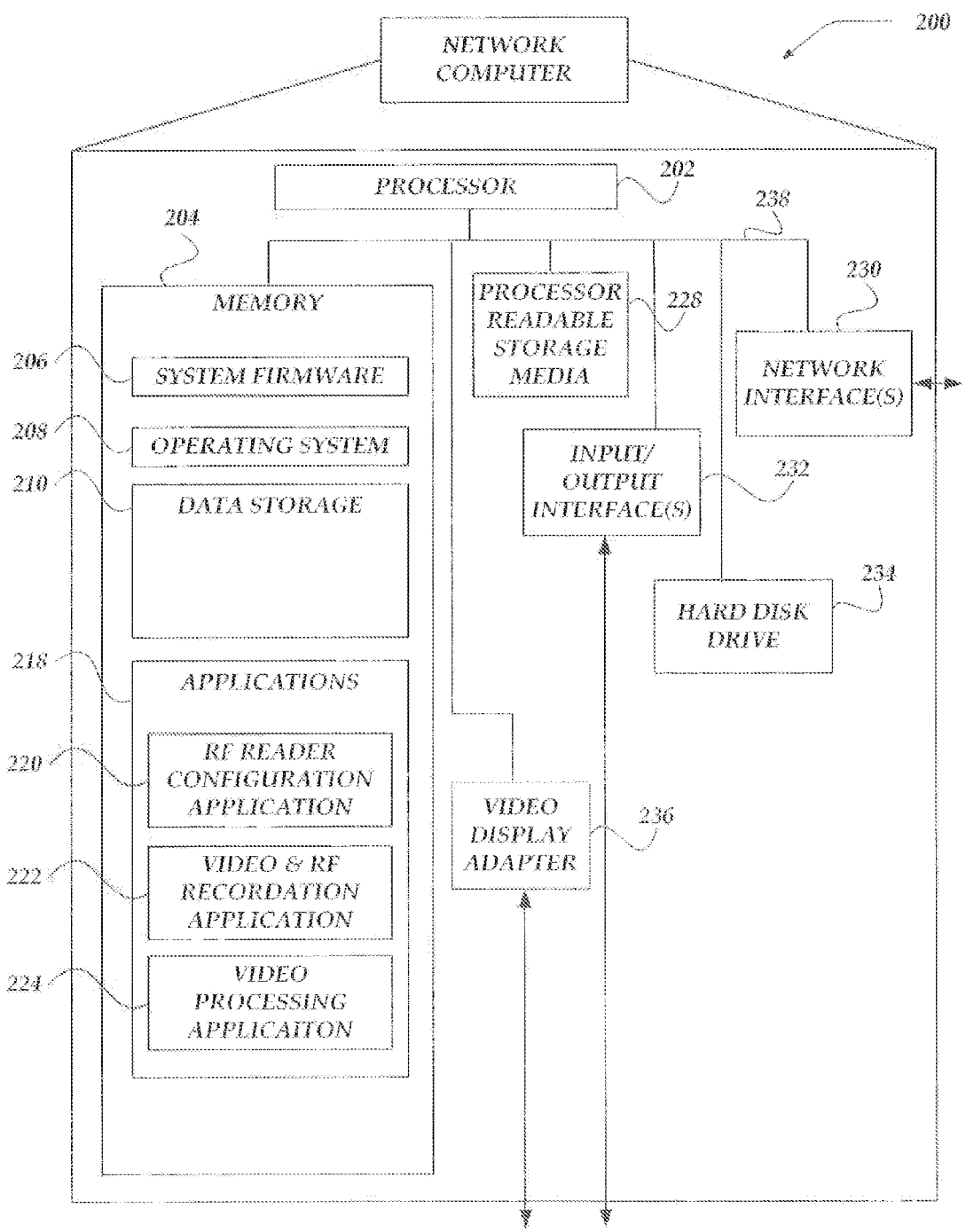
FIG. 2 shows an embodiment of a network computer that may be included in a system such as that shown in FIG. 1.

FIG. 2 shows one embodiment of a network computer 200 that may be utilized to implement embodiments of the invention. Network computer 200 may represent, for example network computer 102 of FIG. 1, and/or other network devices. In various embodiments, network computer 200 may be a standalone device or may be embedded into another device, such as, for example RF reader 104 of FIG. 1 or video recording device 114 of FIG. 1.

Network computer 200 may include more or fewer components than those shown in FIG. 2, and as such, some components may be optional. The components shown, however, are sufficient to disclose an illustrative embodiment of a network computer. Additionally, examples of the different components described herein should not be construed as limiting or exhaustive—as components and/or computer configurations may vary between computing devices and may change over time.

Network computer 200 may be configured to operate as a server, client, peer, a host, or other computing device. In general network computer 200 may be a desktop computer, mobile computer (e.g., laptop computers, smart phones, tablets, or the like), server computer, or any other network computer that can communicate through a network and process series of RF values and video streams, as described herein.

Network computer 200 may include processor 202 in communication with other components via bus 238. Network computer 200 may include memory 204, processor readable storage media 228, network interface(s) 230, an input/output interface 232, hard disk drive 234, video display adapter 236, and other components not shown. In some embodiments, processor 202 may include one or more central processing units (CPU), in various embodiments, processor 202 may include and/or be a Digital Signal Processor (DSP).

Memory 204 may include various types of storage technologies, which may include various types of non-volatile storage, volatile storage, or a combination thereof. Examples of memory 204 may include, but are not limited to Random Access Memory (RAM), dynamic RAM (DRAM), static RAM (SRAM), Read-only Memory (ROM), Electrically Erasable Programmable Read-only Memory (EEPROM), flash memory, hard disk drives, optical drives, magnetic computer storage devices, tape drives, floppy disk drives, or other processor-readable storage media. In some embodiments, memory 204 may include processor-readable transitory or non-transitory storage media. In various embodiments, memory 204 may include one or more caches.

Memory 204 may be utilized to store information, such as, but not limited to, processor-readable instructions (also referred to as computer-readable instructions), structured and/or unstructured data, program modules, or other data/information. In various embodiments, some of the data/information stored by memory 204 may be used by processor 202 to execute and/or perform actions. In some embodiments, at least some of the data/information stored by memory 204 may also be stored on another component of network computer 200, such as, but not limited to, process-readable storage media 228. Processor-readable storage media 228 may include one or more storage technologies, such as, but not limited to, those storage technologies described above for memory 204. In various embodiments, processor-readable storage media 228 may also be referred to as computer-readable storage media, processor-readable storage devices, and/or computer-readable storage devices. In some embodiments, process-readable storage media 228 may be removable or non-removable from network computer 200.

Memory 204 may include system firmware 206 that may store instructions for controlling low-level operations of network computer 200. Examples of system firmware 206 may include, but are not limited to, basic input/output system (BIOS), Unified Extensible Firmware Interface (UEFI), other standards and/or specifications, or the like.

Memory 204 may also store operating system 208 for controlling the operation of network computer 200. In some embodiments, operating system 206 may include a general purpose operating system (e.g., a version of Microsoft Corporation's Windows or Windows Phone™, Apple Corporation's OSX™ or iOS™, Google Corporation's Android, Vs Works, UNIX. LINUX™, or the like). The operating system functionality may be extended by one or more libraries, modules, plug-ins, or the like.

Memory 204 may include data storage 210 and/or applications 218. In some embodiments, data storage 210 can be utilized by network computer 200 to store various data and/or informal ion. Such data/information may include, but is not limited to, capabilities of network computer 200 (e.g., type of processor(s), amount of available memory, operating system, or the like), social networking information (e.g., address books, friend lists, abases, user profile information, or the like), messages, web-page content, user-generated content, application-specific information, program code, algorithms, structured and/or unstructured data, or the like, or any combination thereof. The information stored by data storage 210 may be in various different tonus, such as, for example, databases, text, spreadsheets, folders, files, or the like. In at least one of various embodiments, data storage 210 may also store applications 218.

In one embodiment, at least some of data store 210 might also be stored on another component of network computer 200, including, but not limited to processor-readable storage media 228, hard disk drive 234, or the like.

Applications 218 may include programs and/or computer executable instructions that—when executed by a processor—enable network computer to process data, perform actions, communicate over a network, or the like. Depending on an arrangement of network computer 200 (e.g., as a client computer or a server computer), application 218 may include server computer applications, client computer applications, or the like, or some combination thereof.

Applications 218 may include RF reader configuration application 220, video and RF recordation application 222, and/or video processing application 224. Although these applications are illustrated separately, the functionality of at least these applications may be employed as a single application, various combinations of applications, separate applications, or the like.

RF reader configuration application 220 may be operative to determine a translation function for converting a set of RF values—i.e., a plurality of RF values that are associated with an RF tag and recorded by a plurality of RF readers—into a two-dimensional pixel location within, a video frame. In various embodiments, the RF reader configuration application 220 may normalize multiple sets of RF values—where each set includes RF values from each RF reader for a single RF tag that is physically positioned in a scene at a in known video frame pixel location—with a plurality of known RF tag locations within a video thane to determine/generate the translation function.

Video and RF recordation application 222 may be operative to control the synchronization of recording of the video stream and the plurality of series of RF values. In some embodiments, user interface for application 222 may enable a user to control the beginning and ending of the video and series of RF values. For example, the user may push a "Start Recording" button in a user interlace. The application may send a message to and/or otherwise instruct each RF reader and a video recording device to begin recording. In some embodiments, the application may provide a timestamp to each RF reader and the video recording device, which may be employed to synchronize the series of RF values with the video stream. One example method for performing such timestamping may be Society of Motion Picture and Television Engineers (SMPTE) timecode.

In other embodiments, the user may push a "Stop Recording" button, which may instruct the RF readers and video recording device to stop recording. In some embodiments, this instruction may also request that the RF readers and/or video recording device send their recorded streams to network computer 200. However, embodiments are not so limited, and in other embodiments, each recorded stream may be manually requested and/or obtained from each device (e.g., by using a USB drive to transfer the recorded streams from the RF reader and/or video recording device to the network computer).

Video processing application 224 may be operative to employ the translation function and the recorded series of RF values to determine a location of each tracked object (i.e., each object that has an RF tag attached to it) in one or more video frames of the recorded video, in various embodiments, video processing application 224 may be enabled to filter incoming RF values (e.g., RSSI/distance values) to reduce the "jumpiness" of RF values. For example, RSSI values sometimes vary and jump around over short time periods due to the nature of RF signals, such as multi-path propagation, reflection, scattering and other properties—all of which can impact the RSSI value. So slight variations in the movement of the RF tag and/or RF reader can cause this "jumpiness," or undesired time varying aberrations or perturbations of the RSSI value. In at least one embodiment, video processing application 224 may employ a filter to smooth out and remove some of the jumpiness of the RF values, which may improve the accuracy of the recorded RF values.

In some embodiments, video processing application 224 may embed the location of each object into the metadata of the video stream. In some embodiments, application 224 may also embed a size and/or shape of the object in the metadata of the video stream. In various embodiments, the size and/or shape of an object may be predetermined or determined based on additional processing of the video and/or RF values. For example, in various embodiments, a plurality of tags attached to a same object may be employed to determine the size/shape of the object. In other embodiments, a depth of the object in the three-dimensional scene may be determined based on the translation function, which may indicate whether a size of the object is larger (closer to the video recording device) or smaller (farther away from the video recording device). In yet other embodiments, the determined object location may be utilized to centralize object recognition software on the video to determine a shape and/or size of the object. However, embodiments are not so limited and other embodiments may be employed to determine a shape and/or size of the tracked object within the video frame based on the determined video frame location of an RF tag/object.

Video processing application 224 can also employ various other post processing actions and/or algorithms on the video stream. For example, in some embodiments, video processing application 224 may utilize the tracked location of an object to indicate an approximate location of an object in a video frame. The application may then perform object recognition software on the video relative to the tracked location to try and further identify the tracked object, or to determine an outline of the tracked object within the video frame.

In any event, RF reader configuration application 220, video and RF recordation application 222, and/or video processing application 224 may be configured to employ various embodiments, combinations of embodiments, processes, or parts of processes, as described herein.

Applications 218 may also include other applications, which may, in some embodiments, enable a user to perform various online and/or offline activities. Examples of such other applications may include, but are not limited to, calendars, search programs, email client applications, IM applications, SMS applications, contact managers, task managers, schedulers, database programs, word processing programs, security applications, spreadsheet applications, games, navigation applications, and so forth.

In some embodiments network computer 200 may be a web-enabled client computer and may include a browser application. A browser may include applications configured to perform various online activities. In some embodiments, the browser may be enabled to receive and display web pages, graphics, text, multimedia, messages, other content, or the like. The browser may employ various web-based languages, including, but not limited to, Handheld Device Markup Language (HDML), Wireless Markup Language (WML), WMLScript, JavaScript, Standard Generalized Markup Language (SGML), HyperText Markup Language (HTML), extensible HTMP (xHTML), extensible Markup Language (XML), HTML5, or the like.

Although FIG. 2 illustrates each of applications 218 as being stored and/or executed on a single computer, embodiments are not lo limited; but rather, these applications or functions of these applications may be stored and/or executed on the same computer, separate computers, or some combination thereof.

Network interface 230 may include circuitry that enables network computer 200 to communicate of one or more networks. Network interface 230 may be operative to be used with one or more communication protocols and/or technologies, including, but not limited to, GSM, CDMA, TDMA, UDP, TCP/IP, SMS, MMS, GPRS, WAP, UWB, WiMax, SIP/RTP, EDGE, W-CDMA, LTE, UMTS, OFDM, CDMA2000, Ev-DO, HSDPA, or any of a variety of other communication protocols and/or technologies. Network interface 230 is sometimes known as a transceiver, transceiving device, or network interface card (NIC).

Input/output interface 232 may be operative for communicating with external peripheral devices or other computing devices (e.g., client computers, server computers, and/or other network computers). Example peripheral devices may include, but are not limited to, video recording devices (e.g., video recording device 114 of FIG. 1), RF readers (e.g., RF readers 104-106 of FIG. 1), RF tags (e.g., RF tag(s) 112 of FIG. 1), audio headsets, remote speaker systems, display screen glasses, televisions, printers, remote control devices, or other input or output devices not shown in FIG. 2. Input/output interface 232 can utilize one or more communication technologies, such as Universal Serial Bus (USB), infrared, Wi-Fi, WiMax, Bluetooth™, wired technologies, or the like.

Network computer 200 may include various other interfaces and/or components not illustrated in FIG. 2. Examples of other interfaces/components may include, but are not limited to, a display, a pointing device, a keyboard/keypad, audio/video interfaces, GPS receiver, or the like. In some embodiments, some interfaces and/or components may utilize, be embodied with, and/or may operate in conjunction with other interfaces and/or components described herein to perform at least some of its actions.

In some embodiments, network computer 200 may include a video interlace for recording video streams (e.g., if network computer 200 is embedded in video recording device 114 of FIG. 1). In various embodiments, the video interface may be operative to capture video segments or streams (or still photos/images) through a digital video camera, a web-camera, or the like. The video interface may comprise a lens, an image sensor, image signal processor (ISP), and other electronics. Image sensors may include a complementary metal-oxide-semiconductor (CMOS) integrated circuit, charge-coupled device (CCD), or any other integrated circuit for sensing light. ISPs may include general purpose signal processors, dedicated hardware logic, and any combination of the two.

General Operation

Operation of certain aspects of the invention will now be described with, respect to FIGS. 3-5. In at least one of various embodiments, at (east a portion of Processes 300, 400, and 500 described in conjunction with FIGS. 3-5, respectively, may be implemented by and/or executed on one or more network computers, such as network computer 200 of FIG. 2. Additionally, various embodiments described herein can be implemented in a system such as system 100 of FIG. 1.

Figure 3:
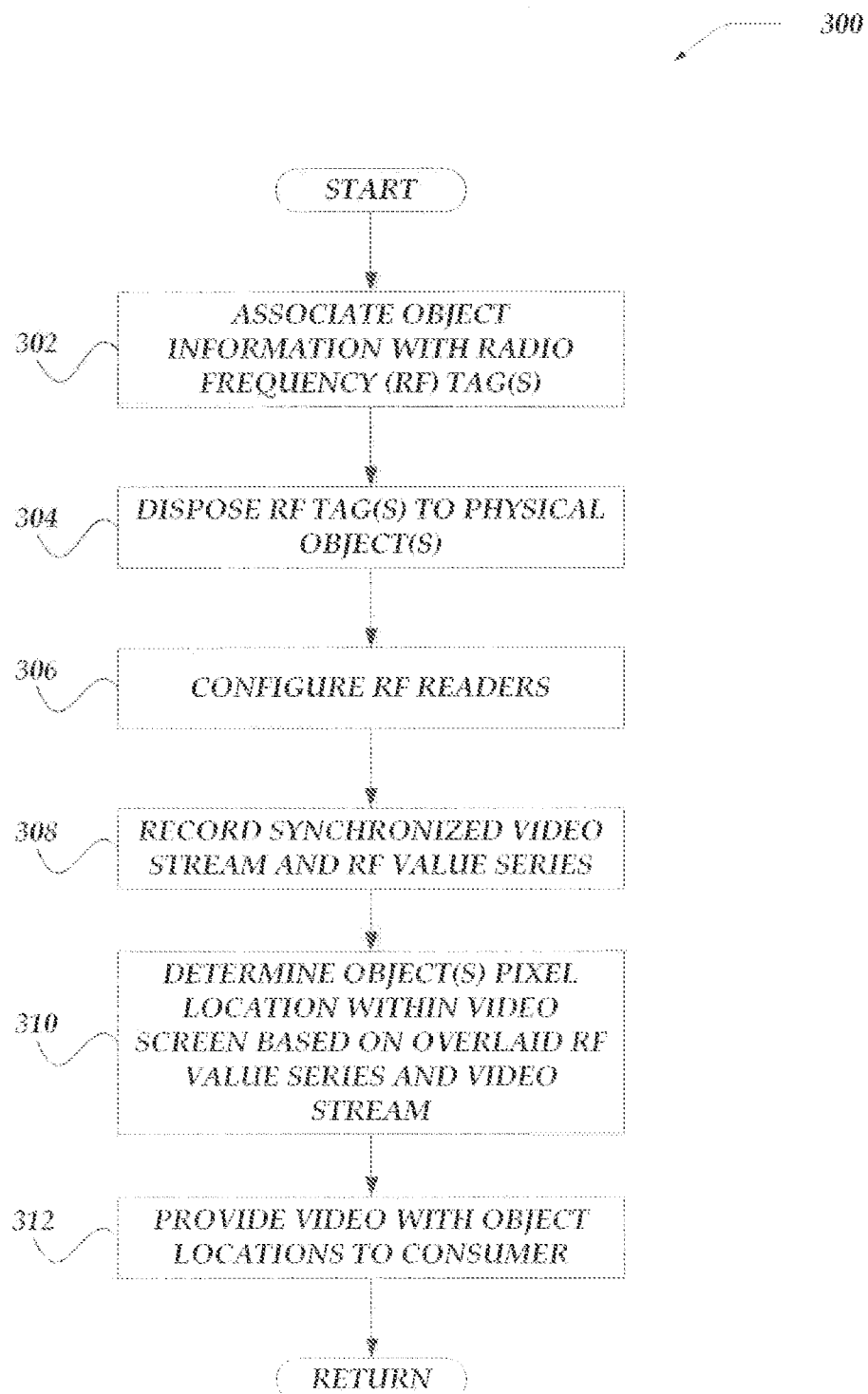
FIG. 3 illustrates a logical flow diagram of an environment generally showing an embodiment of an overview process for tracking a location of an object in a 2-D video screen based on RF tag signals associated with the object in a 3-D space.

FIG. 3 illustrates a logical flow diagram of an environment generally showing an embodiment of an overview process for tracking a location of an object in a 2-D video screen based on RF tag signals associated with the object in a 3-D space.

Process 300 may begin, alter a start block, at block 302, where object information may be associated with one or more RF tags. In some embodiments, each separate RF tag may correspond to a separate object. An object may be a physical object that may be in a scene and visible within a field of view of a video recording device, such that the object may be at least partially visible in one or more video frames of a video recorded by the video recording device. So, the object may be visible to a user in a video screen during playback of the video. In some embodiments, the object information may be embedded, stored, or otherwise programmed into the RF tag. In other embodiments, a database may be maintained to include an identifier of the RF tag and a link to the corresponding object information.

This object information may include, but is not limited to, product information (e.g., size, color, price, quantity remaining, or the like), hyperlinks to a retailer webpage or other web store where a user can obtain additional product information or can purchase a good or service (e.g., the object in the video), or the like.

Process 300 may proceed to block 304, where the RF tag(s) may be dispose to the physical objects). An RF tag may be affixed to an object, by manually attaching a clasp, a pin, or other attachment mechanism to the object and to the RF tag. In some embodiments, an adhesive may be employed to attach an RF tag to an object, in other embodiments, the RF tag may be built in or otherwise embedded into the object in yet other embodiments, the RF tag may be included in a cavity, opening, aperture, carrying device, or the like, which can contain and/or otherwise maintain the RF tags association/physical placement on the object.

In various embodiments, a single tag may be disposed to each separate object. However, embodiments are not so limited; but rather, in some embodiments, a plurality of tags may be affixed to a single object to track a shape (and location) of object within a video frame. For example, separate RF tags may be attached to each cuff of a shin, the collar of the shirt, and the bottom hem of the shirt. By individually tracking a location within the video frames of each tag—by employing embodiments described herein—a relative shape of the shirt may be determined.

Process 300 may continue at block 306, which is described in more detail below in conjunction with FIG. 4. Briefly, however, a plurality of RP readers may be configured such that RF values of RF signals received from RF tags can be normalized to known pixel locations within a video frame.

Process 300 may then proceed to block 308, where a video stream and series of RF values may be synchronously recorded. In various embodiments, a video recording device (e.g., video recording device 114 of FIG. 1) may record a video of a scene that may include the objects that have tags attached thereto. At the same time, a plurality of RF readers may record a series of RF values from each separate RF tag. As described herein, one series of RF values may be recorded by one RF reader for one RF tag.

Each series of RF values may include a plurality of RF values (e.g., RSSI/distance values). RF values may be recorded at different intervals depending on predetermined granularity of the object location tracking. In some embodiments, RF values may be recorded at a same rate as the video frames of the video stream. However, embodiments are not so limited, and other intervals and/or RF value recording frequencies may also be employed (e.g., one RF value every other video frame, five RF values over second, or the like).

In some embodiments, the video recording device may send instruction to the plurality of RF readers to begin recording RF values of RF signals received from the tags. In other embodiments, the video recording device and the plurality of RF readers may timestamp each video stream and series of RF values such that the streams can be synchronized (e.g., by network computer 102 of FIG. 1).

In various embodiments, the video recording device may also include an RF tag and the RF readers may record a series of RF values for the video recording device. This series of RF values associated with the video recording device may be employed to track movement of the video recording device relative to the tracked objects. In some embodiments, multiple RF tags or other direction/orientation tracking mechanisms (e.g., accelerometers, gyroscopes, tilt sensors) may be employed with the video recording device to determine if the video recording device pans, tilts, or rotates, or moves horizontally or vertically.

Process 300 may then continue at block 310, which is described in more detail below in conjunction with FIG. 5. Briefly, however, the series of RF values may be overlaid with the video stream, such that a pixel location within each video frame of the video screen may be determined for each object that included an RF tag during the video and RF recording.

Process 300 may proceed to block 312, which is described in more detail below in conjunction with FIG. 6. Briefly, however, the video with the object locations may be provided to a user, viewing user, or consumer, such that the user may interact with the video to obtain additional information regarding the tracked objects.

After block 312, process 300 may terminate and/or return to a calling process to perform other actions.

Figure 4:
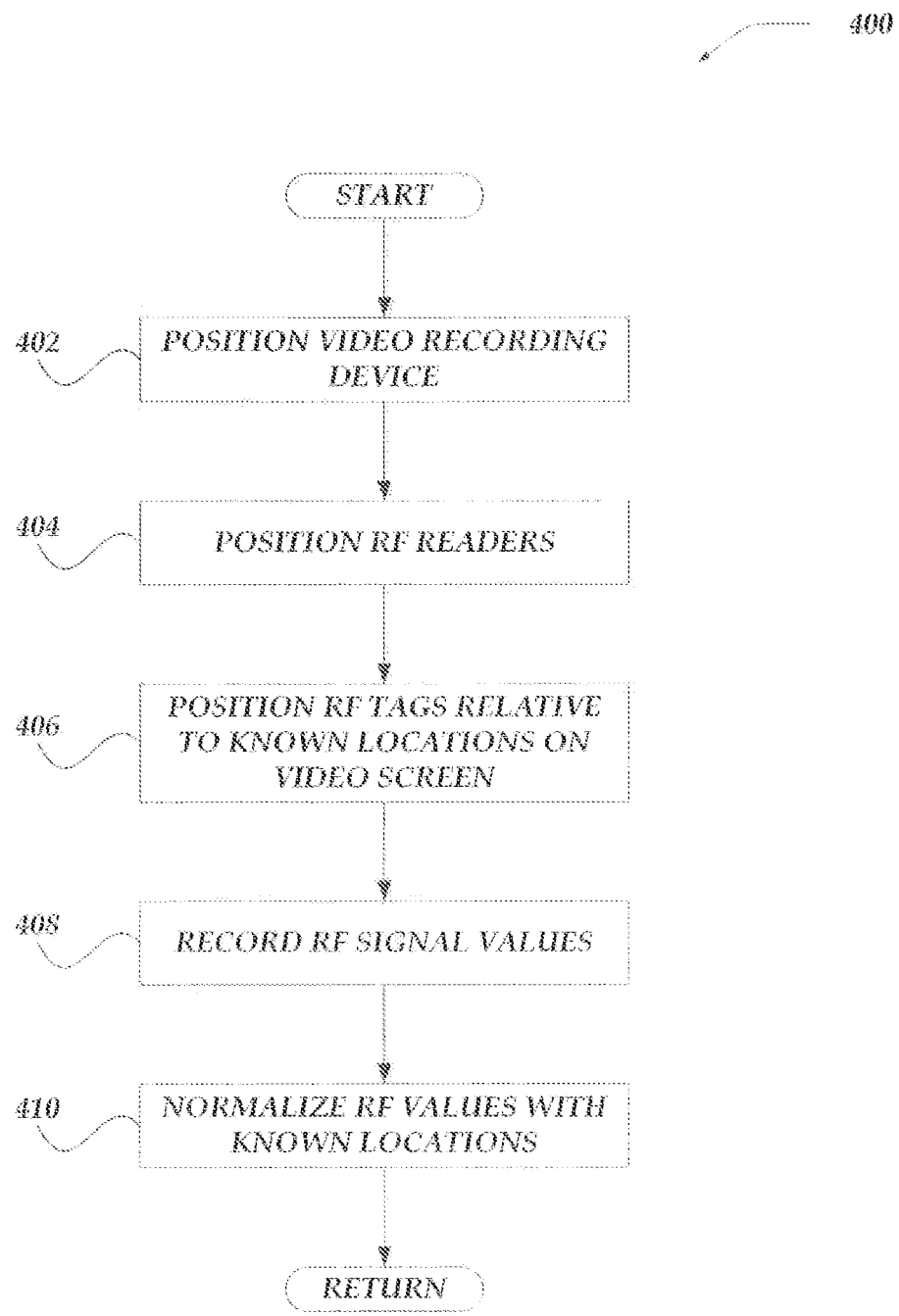
FIG. 4 illustrates a logical flow diagram of an environment generally showing an embodiment of a process for normalizing RF tag signals in a 3-D space to a location on a 2-D video screen.

FIG. 4 illustrates a logical flow diagram of an environment generally showing an embodiment of a process for normalizing RF tag signals in a 3-D space to a location on a 2-D video screen.

Process 400 may begin, after a start block, at block 402, where a video recording device may be positioned relative to a scene to be recorded, in some embodiments, the video recording device may be stationary. In other embodiments, the video recording device may be mobile. As indicated above, the video recording device may include RF tags and/or other direction/orientation mechanisms, which may be employed to track a position/movement of the video recording device comparative to the RF tags.

Figure 7:
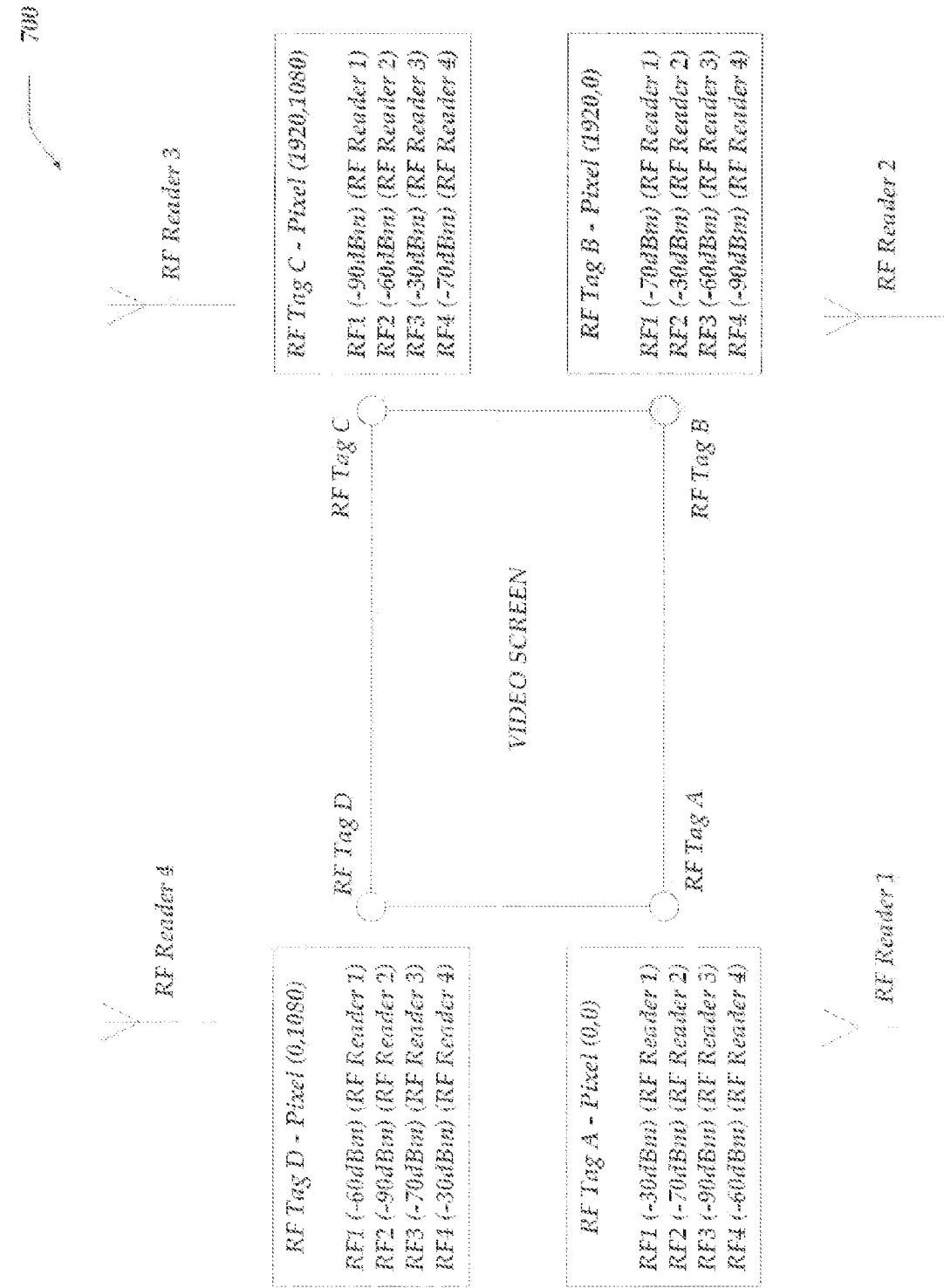
FIG. 7 shows a use-case example of an embodiment for normalizing RF tag signals to known locations on a video screen.

Process 400 may proceed to block 404, where a plurality of RF readers may be positioned relative to the scene and to the video recording device. In some embodiments, three or more RF readers may be employed. In at least one such embodiment, the RF readers may be positioned to maximize the two-dimensional aspect of the video recording device. For example, the RF readers may be positioned relative to each corner of the field of view of the video recording device, such as is illustrated in FIG. 7. However, embodiments are not so limited and other positions of the RF readers may be employed.

In some embodiments, the RF readers may be positioned outside of the scene (i.e., outside the field of view of the video recording device), but in a position that they can acquire RF signals from the RF tags. In other embodiments, the RF readers may be positioned within the scene (i.e., inside the field of view of tire video recording devices, but may be "out of sight" from the video recording device. In some embodiments, the RF readers may be positioned in to create a plane that is parallel to the lens of the video recording device, which may reduce an amount of computation needed to translate/normalize recorded RF values into pixel location in a video frame. However, embodiments are not so limited and other configurations, layouts, and/or positions of the RF readers may be employed.

Process 400 may continue at block 406, where a plurality of RF tags may be physically positioned in the scene in the field of view of the video recording device relative to known pixel locations in a video frame (i.e., within the video screen of the video recording device). In some embodiments, a tag may be positioned to be at each corner of the video frame. In other embodiments, a tag may be positioned at opposing corners of the video frame. In at least one embodiments, separate RF tags may be employed, while in other embodiments, a single RF tag may be separately positioned at each known location, where RF signal values may be recorded (e.g., at block 408) for each location.

In some embodiments, an RF tag may be placed at each of the RF readers. In this configuration the RF value (e.g., RSSI/distance) may be zero from that corresponding reader while the RF values from the other readers may yield a value that may be used to normalize the RF values. These values can then translate to pixels or groups of pixels (e.g., at block 410).

Process 400 may proceed to block 408, where the RF signal values may be recorded. In various embodiments, each of the plurality of RF readers may receive an RF signal from the RF tag. Each RF reader may determine an RF value based on the RF signal. For example, the RF reader may determine an RSSI of the received RF signal. However, embodiments are not so limited and other RF values may be determined based on the received RF signal.

As mentioned above, a plurality of tags may be employed (one at each known location). In at least one such embodiment, each RF reader may determine an RF value for each separate tag. In other embodiments, a single tag may be separately employed for each known pixel location. In at least one such embodiments, each RF reader may determine an RF value of the tag at a first position (for a first known location in the video frame), the lag may be moved to a second position (for a second known location in the video frame) and RF values determined for the second position, and so on until RF values are determined for a plurality of known locations in the video frame.

Process 400 may continue next at block 410, where the RF values may be normalized to determine/generate a translation junction. This function may be determined to translate the plurality of RF values into at least one known pixel location within a video frame of a scene that includes the physical location of at least one object. In some embodiments, these known pixel locations may be referred to as initial pixel locations. The known pixel locations/initial pixel locations may enable a field of view to be identified for the scene in the video frame (e.g., the boarder of the video frame for within which objects may be tracked).

The translation function may decline a pixel location for each known video frame location based on the RF values that correspond to the tags at the various known locations. In some embodiments information regarding the position/orientation of the video recording device may also be employed to determine the translation function. Various normalization algorithms known to those skilled in the art may be employed to generate the translation function based on the known video frame locations and corresponding RF values. FIG. 7 illustrates an embodiment of employing RF values for RF tags at known locations to define pixel locations within a video frame. In some embodiments, the RF values may be employed to directly translate to pixel locations. In other embodiments, oilier distance algorithms may be employed, such as triangulation (e.g., if the RF values include DOA), trilateration (e.g., if the RF values are based on RSSI values and transmission power), or the like.

In some embodiments, additional image processing known to those skilled in the art may also be performed. For example, various algorithms known to those skilled in the art may be employed to remove distortions caused by the curved shape of the video recording device lens.

In various embodiments, the RF signals may be translated into a normalized screen position. In at least one such embodiment, the video may be transmitted with the normalized screen position. And a customized video codec may be enabled to convert the normalized screen position into a pixel location. The normalized screen position may be employed for different displays that may have different number of pixels (e.g., because of different screen sizes, different resolutions, or the like).

After block 410, process 400 may terminate and/or return to a calling process to perform other actions.

Figure 5:
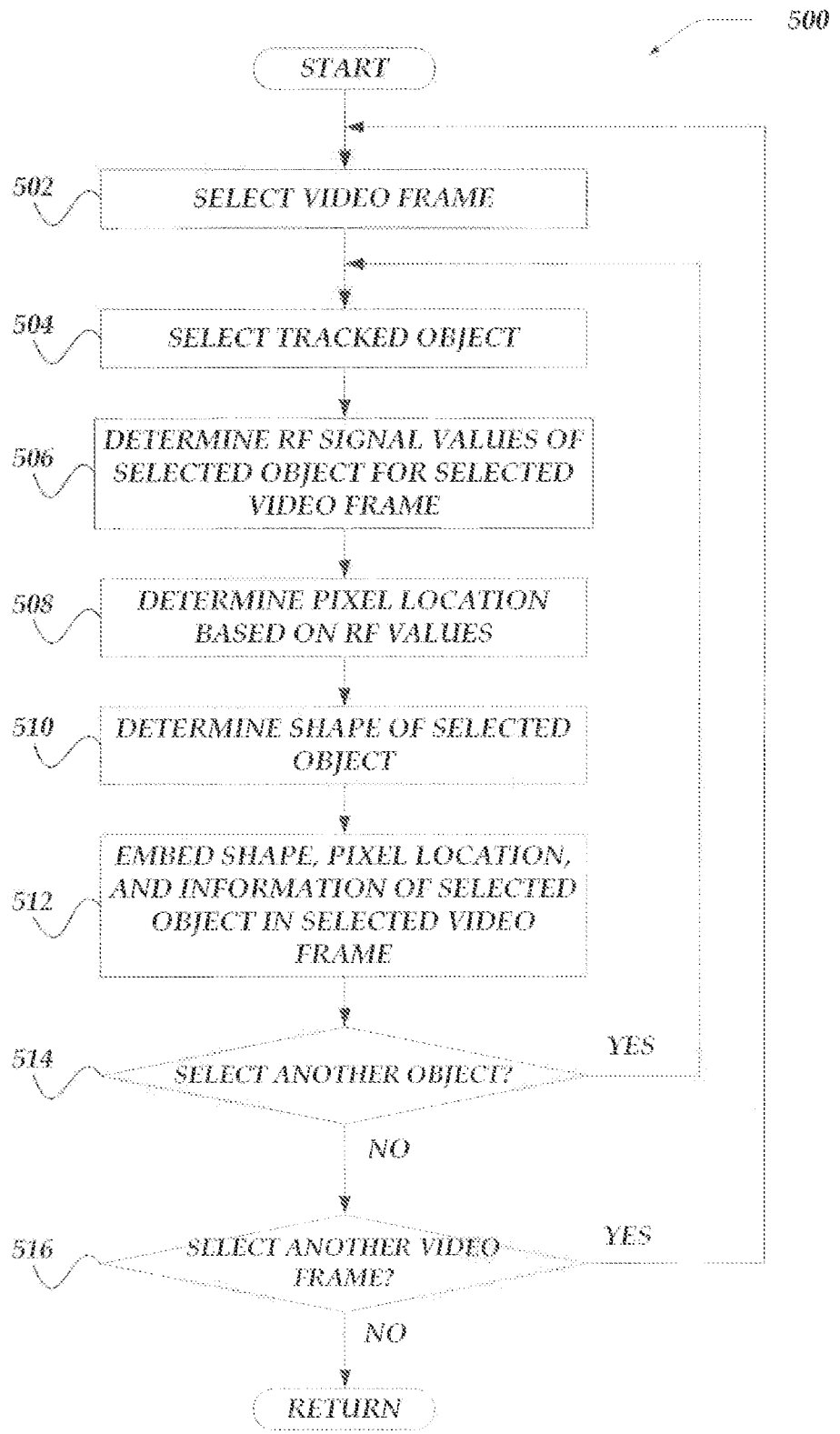
FIG. 5 illustrates a logical flow diagram of an environment generally showing an embodiment of a process for overlaying a series of RF values onto a video stream to track an object in a video screen.

FIG. 5 illustrates a logical flow diagram of an environment generally showing an embodiment of a process tea overlaying a series of RF values onto a video stream to track an object through one or more video frames.

Process 500 may begun after a start block, at block 502, where a video frame may be selected from the recorded video stream. In various embodiments, the video frames may be selected sequentially as they were recorded.

Process 500 may proceed to block 504, where a tracked object may be selected. In at least one of various embodiments, selecting the tracked object may include selecting the series of RF values recorded from the RF tag that corresponds (or is disposed) to the selected object.

Process 500 may continue at block 506, where the RF signal values for the selected object may be determined for the selected video frame. As indicated herein, the series of RF values and the video stream may be synchronously recorded. So each video frame may be associated with separate RF values for each RF reader (and for each tracked object). Assume there are four RF readers and three tracked objects. Each video frame may include 12 separate RF values, (four values for each separate tracked object). As indicated herein, RF values may be recorded for each video frame or at a different interval, such as every x number of video frames.

Process 500 may proceed next to block 508, where a pixel location within the video frame of the selected object may be determined. In various embodiments, the RF values for the selected object may be input into the translation function (as determined at block 410 of FIG. 4) to determine a two-dimensional pixel location of the selected object within the selected video frame. In various embodiments, RF values (or directional/orientation mechanism values) of the video recording device may be employed with the translation function to determine the pixel location. As indicated above, the pixel location may be a group or region of pixels.

Process 500 may continue next at block 510, where a shape of the selected object may be determined. In some embodiments, the shape may be predetermined (which may be based on the type and/or size of the object). In at least one embodiment, the predetermined shape may be a circle, square, rectangle, or other shape of a predetermined size such that when a user clicks on the region defined by the shape, an action may be triggered (e.g., display additional object information to the user), as described in more detail below in conjunction with FIG. 6. In other embodiments, the shape may be determined by employing object recognition processing on the video frame, which may be initiated and/or centered about the determined pixel location. In this way, the object recognition processing as an idea of where to look for the object, without checking the entire image (e.g., the object recognition processing may only process a portion of the image near the determined pixel location). And even if the shape of the object cannot be determined by the object recognition processing, the predetermined shape may still be employed.

In some other embodiments, the translation function may output a depth value of the object (along with the two-dimensional pixel location). This depth value may be employed to determine a size of a box and/or shape of the object. This box and/or shape may be employed (as described in FIG. 6) to enable a user to select the object while viewing the video to obtain additional information about the object.

In some embodiments, object recognition and/or depth information may be employed to determine if the selected object is not visible in the selected video frame. As the video is recorded, objects may move around. Objects may move in front of or behind other objects. If the object is behind another object (i.e., is not visible in the video frame), then the shape and/or location of that object may be discarded or otherwise ignored for the selected video frame. This discarding may reduce problems that can occur with overlapping objects, especially where one object is completely overlapped by another.

Process 500 may proceed to block 512, where the shape and pixel location of the selected object may be embedded into the selected video frame. In various embodiments, an identifier of the object (e.g., the identifier of the corresponding tag) may be embedded into the metadata of the video stream. In various embodiments, additional object information may also be embedded, which may include, but is not limited to, hyperlinks to one or more product/service websites; price of the object; available sizes, color, quantity, or the like; various instructions regarding the product; or the like. In some embodiments, the additionally embedded information may be a link to a database that may include the additional object information.

As indicated above, if the selected object is not visible within the selected video frame, then in some embodiments, the shape, location, and additional information may not be embedded in the video stream for the selected video frame. However, embodiments are not so limited, and in other embodiments, the shape, location, and additional information may be embedded even though the object is not visible (but a user viewing the video might know where the object is because of previous location of the object). In various embodiments, a region may be overlaid over the at least one object in the field of view of the scene based on the at least one pixel location in the recorded video frames, wherein an interaction by a user with the region enables at least one action associated with the at least one object.

Figure 8:
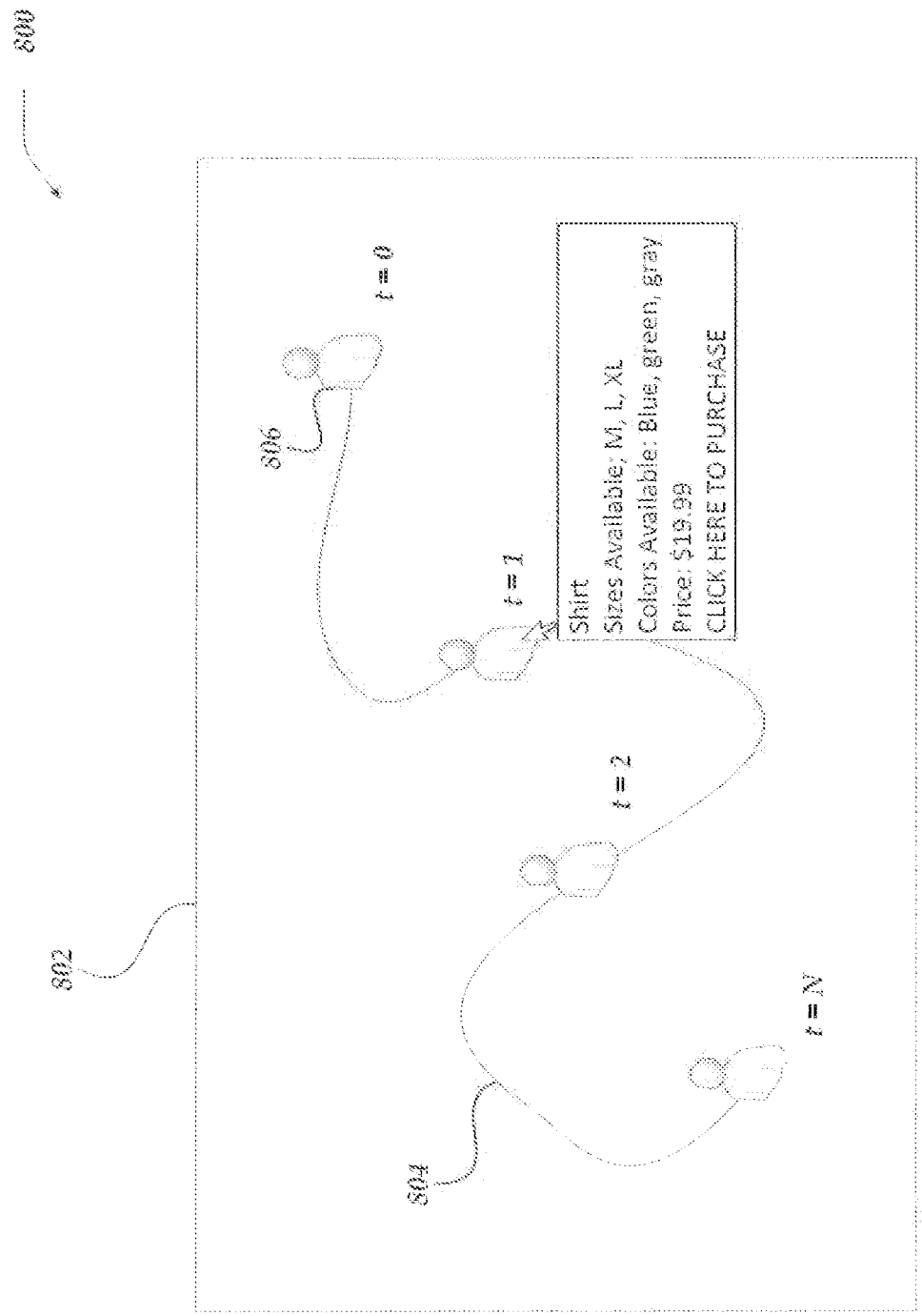

In at least one of various embodiments, metadata associated with the selected video frame may be modified to include the shape and pixel location of the selected object. In some embodiments, the metadata may also include information regarding how additional information associated with an object may be displayed to the user if a user interacts with the region associated with the pixel location (e.g., as described in FIG. 6). For example, the additional object information may be shown in the video screen (such as illustrated in FIG. 8) or to the side of the screen as to not corrupt the viewing of the video (such as illustrated in FIG. 9). In some embodiments, a user/video producer may be enabled to choose how the object information may be displayed to a user.

Process 500 may continue at decision block 514, where a determination may be made whether another object may be selected. In some embodiments, another object may be selected if multiple objects were used in the scene and have corresponding series of RF values. If another object may be selected, process 500 may loop to block 504 to select another object; otherwise, process 500 may flow to decision block 516. In some embodiments, each tracked object may be selected prior to going to a next video frame.

At decision block 516, a determination may be made whether another video frame may be selected. In various embodiments, video frames may be sequentially selected until each video frame in the video stream has been selected and processed. If another video frame may be selected, process 500 may loop to block 502; otherwise, process 500 may terminate and/or return to a calling process to perform other actions. In some embodiments, each video frame may be processed for a given object before selecting another object.

Figure 6:
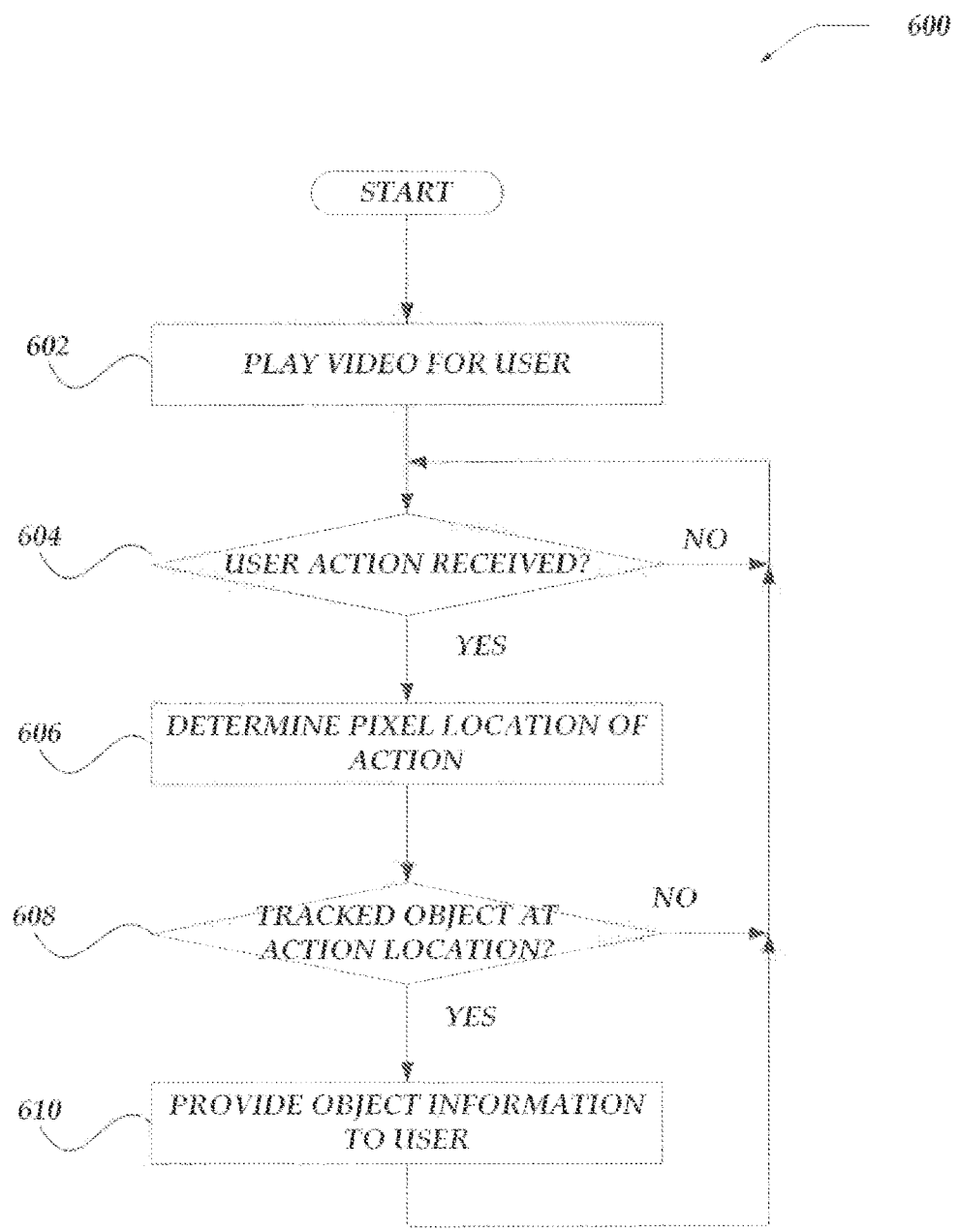
FIG. 6 illustrates a logical flow diagram of an environment generally showing an embodiment of a process for enabling a user to utilize a video with object locations.

FIG. 6 illustrates a logical flow diagram of an environment generally showing an embodiment of a process for enabling a user to utilize a video with object locations. Process 600 may begin, alter a start block, at block 602, where a video may played to a user. In various embodiments, the user may access a website that may present the video to the user. The video may be a video stream that has object information embedded therein by employing embodiments described herein.

Process 600 may proceed to decision block 604, where a determination may be made whether user action has been received. The user action may be any of a variety of selection mechanisms for selecting an area within the video. For example, a user may mouse over the video, click on the video, or the like. If a consume action is received, process 600 may proceed to block 606; otherwise, process 600 may loop to decision block 604 to continue to wait for a user action while the video is playing.

At block 606, a pixel location within the video frame of the user action may be determined. In at least one embodiment this pixel location may be the pixel location of the mouse pointer when the user clicks the mouse.

In some embodiments, block 606 may not be performed if object information is displayed, in a side screen for objects that are visible in the video. In at least one such embodiment, the information may be automatically displayed to the user when the object becomes visible in the video (i.e., a video frame metadata includes a determined pixel location of an object in that video frame).

Process 600 may continue at decision block 608, where a determination may be made whether a tracked object is at the action location. In various embodiments, this determination may be made by comparing the action location with the embedded object location (and shape) for the video frame associated with the user action. If there is a tracked object at the action location for that video frame, process 600 may flow to block 610; otherwise, process 600 may loop to block 604 to continue to wait for additional user actions.

At block 610, object information regarding the tracked object at the action location may be provided to the user. In some embodiments, the object information, may be provided in a pop-up window, a new browser tab, text overlay, thumbnails, side viewing panel, side screens, or the like, which may be on top of the video (e.g., as illustrated in FIG. 8) and/or may be next to the video as to not obscure the video (e.g., as illustrated in FIG. 9). This information may be in the form of hyperlinks, animations, enlarged views, other views, tool-tip information, or the like. In various embodiments, information about objects associated with each user action may be stored/collected (e.g., in a "drawer") and provided to the user during or after the video is done playing, or in a side pane or window.

After block 610, process 600 may loop to block 604 to continue to wait for additional user actions.

In various embodiments, after the video is done playing, process may terminate and/or return (not shown) to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein, and shown in the various flowcharts may be implemented as entirely hardware embodiments (e.g., special-purpose hardware), entirely software embodiments (e.g., processor-readable instructions), user-aided, of a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Use Case Illustrations

FIG. 7 shows a use-case example of an embodiment for normalizing RF tag signals to known locations on a video screen. System 700 may include a plurality of RF readers (e.g., RF Reader 1, RF Reader 2, RF Reader 3, and RF Reader 4) and a plurality of RF tags (e.g., RF Tag A, RF Tag B, RF Tag C, and RF Tag D). The video screen may indicate a held of view of a video frame recorded by a video recording device. Each of the RF tags may be positioned within a scene such that they are located at known locations on the video screen, here at different corners of the video screen. The RF readers may be position within the scene. As illustrated, the RF readers may be positioned outside the field of view and relative to separate corners of the video screen.

Each of the RF readers may record an RF value associated with each separate RF tag. So, for example, RF Readers 1, 2, 3, and 4 may record RF values of −30 dBm, −70 dBm, −90 dBm, and −60 dBm, respectively, for RF Tag A. These RF value may be normalized to a pixel location of (0,0). Similar calculations may be performed for each of the other RF tags at the different known locations.

It should be understood that the positioning and number of RF readers may vary. Similarly, the positioning and number of RF tags may vary, such that a plurality of known locations on the video screen may be determined from the RF values.

FIG. 8 shows a use-case example of an embodiment of a video with a tracked object. Example 800 may be a video screen, user interlace, viewing pane within a webpage, or the like. By employing embodiments described herein, a location of object 804 may be tracked within video screen 802. Fine 804 may indicate the path of tracked object 806 within video screen 802 over a given time (e.g., for a plurality of video frames).

When a user mouses-over or clicks on a location of object 806, information about that object may be provided to the user. As illustrated, this information may include product information, hyperlinks to a retailer webpage, or the like. FIG. 8 illustrates a tool-tip for providing this object information, but other visuals may also be employed. In various embodiments, the information may be embedded in the video stream or may be obtained from a database. By employing a database, the presented information may be altered or changed without having to modify the embedded information in the video.

Although embodiments are described primarily as video advertisements of goods or services, embodiments are not so limited. And other embodiments may be employed in other areas that utilize video. For example, embodiments described herein may be employed with real-time television viewing, such as football or hockey. In a football setting, each player may include an RF tag on their helmet (or other equipment) and a plurality of RF readers may be positioned around the football field and/or stadium. By employing embodiments described herein, a location of each player in the video thane may be determined and embedded—along with information about that player—into the video stream. A user may be enabled to employ a smart television to select a player and view information about that player, such as, for example, biography information, season statistics, current game statistics, or the like. In another sports example, an RF tag may be attached/embedded in a hockey puck. By employing embodiments described herein a location of the puck on the video screen may be determined and tracked. This may be beneficial to determine if the puck crosses the goal line even if view of the puck is blocked by a player. It should be understood that embodiments described herein can be employed in other scenarios and settings to track object location within a video frame.

FIG. 9 shows a use-case example of an embodiment of a video with a tracked object. Example 900 may be a video screen, user interface, viewing pane within a webpage, or the like. By employing embodiments described herein, a location of object 804 may be tracked within video screen 902. Line 904 may indicate the path of tracked object 906 within video screen 902 over a given time (e.g., for a plurality of video frames). As illustrated, side screen 908 may include information regarding tracked objects that are currently visible in video screen 902. If die tracked object leaves the video screen (i.e., not currently visible), then side screen 908 may update to remove the object. In some embodiments, a user may be enabled to click on the video screen to highlight or display additional information regarding the clicked object.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for tracking objects in a stream of video frames, comprising:
    associating information regarding at least one object with at least one radio frequency (RF) tag, wherein the at least one RF tag is disposed at a physical location of the at least one object;
    receiving from the at least one RF tag at least one RF signal at a plurality of RF readers, wherein the RF readers generate a plurality of RF values based on the at least one RF signal;
    recording a stream of video frames for a scene that includes the at least one object over time;
    recording by each of the plurality of RF readers the plurality of RF values over time for the at least one RF tag;
    determining a pixel location within each video frame and a depth value of the at least one object based on the plurality of RF values;
    determining a shape of the at least one object using the determined pixel location and the depth value; and
    embedding the determined pixel location and the determined shape of the at least one object in one or more video frames of the stream of video frames, comprising:
        discarding at least a portion of one or more of the determined pixel location and the determined shape of the at least one object in response to determining that the at least one object is overlapped in the video frame by another object; and
        embedding any undiscarded pixel location and shape of the at least one object in the one or more video frames of the stream of video frames.

2. The method of claim 1, wherein each RF value is based on a received signal strength indicator and transmission power of the at least one RF signal.

3. The method of claim 1, further comprising:
    overlaying a region over the at least one object in the scene based on the determined pixel location in the recorded video frames, wherein an interaction by a user with the region enables at least one action associated with the at least one object.

4. The method of claim 1, further comprising:
    determining a configuration RF value for at least one second RF tag that is positioned within the scene relative to the at least one RF tag disposed at the physical location of the at least one object; and
    translating the recorded RF values into a normalized screen position for the at least one object positioned in the scene for each recorded video frame based on the recorded RF values and the configuration RF value for the at least one second RF tag.

5. The method of claim 1, further comprising:
providing the recorded stream of video frames to at least one display; and
providing information to the display that corresponds to the at least one object based on a mouse click or mouse over of the determined pixel location corresponding with the at least one object positioned in the scene.

6. A network computer that is operative to track objects in a stream of video frames, comprising:
a memory; and
a processor coupled to the memory and configured with processor-executable instructions to perform operations comprising:
associating information regarding at least one object with at least one radio frequency (RF) tag, wherein the at least one RF tag is disposed at a physical location of the at least one object;
receiving from the at least one RF tag at least one RF signal at a plurality of RF readers, wherein the RF readers generate a plurality of RF values based on the at least one RF signal;
obtaining a recorded stream of video frames for a scene that includes the at least one object over time;
obtaining from each of the plurality of RF readers RF values over time for the at least one RF tag;
determining a pixel location within each video frame and a depth value of the at least one object based on the plurality of RF values;
determining a shape of the at least one object using the determined pixel location and the depth value; and
embedding the determined pixel location and the determined shape of the at least one object in one or more video frames of the stream of video frames, comprising:
discarding at least a portion of one or more of the determined pixel location and the determined shape of the at least one object in response to determining that the at least one object is overlapped in the video frame by another object; and
embedding any undiscarded pixel location and shape of the at least one object in the one or more video frames of the stream of video frames.

7. The network computer of claim 6, wherein each RF value is based on a received signal strength indicator and transmission power of the at least one RF signal.

8. The network computer of claim 6, wherein the processor is further configured with processor-executable instructions to perform operations comprising:
overlaying a region over the at least one object in the scene based on the determined pixel location in the recorded video frames, wherein an interaction by a user with the region enables at least one action associated with the at least one object.

9. The network computer of claim 6, wherein the processor is further configured with processor-executable instructions to perform operations comprising:
determining a configuration RF value for at least one second RF tag that is positioned within the scene relative to the at least one RF tag disposed at the physical location of the at least one object; and
translating the recorded RF values into a normalized screen position for the at least one object positioned in the scene for each recorded video frame based on the recorded RF values and the configuration RF value for the at least one second RF tag.

10. The network computer of claim 6, wherein the processor is further configured with processor-executable instructions to perform operations comprising:
providing the recorded stream of video frames to at least one display; and
providing information to the display that corresponds to the at least one object based on a mouse click or mouse over of the determined pixel location corresponding with the at least one object positioned in the scene.

11. A system for tracking objects in a steam of video frames, comprising:
at least one radio frequency (RF) tag that is disposed at a physical location of at least one object, wherein the at least one RF tag configured to generate at least one RF signal;
a video recording device configured to record a stream of video frames for a scene that includes the at least one object over time;
a plurality of RF readers configured to generate a plurality of RF values based on the at least one RF signal, wherein each of the plurality of RF readers generates RF values over time for the at least one RF tag, wherein the generated RF values are synchronized over time with the recorded stream of video frames; and
a network computer, comprising:
a memory; and
a processor coupled to the memory and configured with processor-executable instructions to perform operations comprising:
determining a pixel location within each video frame and a depth value of the at least one object based on the plurality of RF values;
determining a shape of the at least one object using the determined pixel location and the depth value; and
embedding the determined pixel location and the determined shape of the at least one object in one or more video frames of the stream of video frames, comprising:
discarding at least a portion of one or more of the determined pixel location and the determined shape of the at least one object in response to determining that the at least one object is overlapped in the video frame by another object; and
embedding any undiscarded pixel location and shape of the at least one object in the one or more video frames of the stream of video frames.

12. The system of claim 11, wherein each RF value is based on a received signal strength and transmission power indicator of the at least one RF signal.

13. The system of claim 11, wherein the processor is further configured with processor-executable instructions to perform operations comprising:
overlaying a region over the at least one object in the scene based on the determined pixel location in the recorded video frames, wherein an interaction by a user with the region enables at least one action associated with the at least one object.

14. The system of claim 11, wherein the processor is further configured with processor-executable instructions to perform operations comprising:
determining a configuration RF value for at least one second RF tag that is positioned within the scene relative to the at least one RF tag disposed at the physical location of the at least one object; and translating the recorded RF values into a normalized screen position for the at least one object positioned in the scene for each recorded video frame based on the recorded RF values and the configuration RF value for the at least one second RF tag.

15. The system of claim 11, wherein the processor is further configured with processor-executable instructions to perform operations comprising:
 providing the recorded stream of video frames to at least one display; and
 providing information to the display that corresponds to the at least one object based on a mouse click or mouse over of the determined pixel location corresponding with the at least one object positioned in the scene.

\* \* \* \* \*